United States Patent [19]

Klepper

[11] 4,362,617

[45] Dec. 7, 1982

[54] LIQUID FILTERING APPARATUS

[75] Inventor: Constant L. Klepper, Troy, Mich.

[73] Assignee: Micronic Filtration Inc., Warren, Mich.

[21] Appl. No.: 261,252

[22] Filed: May 6, 1981

[51] Int. Cl.³ .............................................. B01D 25/14
[52] U.S. Cl. ..................................... 210/225; 210/230; 210/387
[58] Field of Search ................................. 55/351–354; 100/198; 210/225, 230, 387

[56] References Cited

U.S. PATENT DOCUMENTS 3,608,734  9/1971  Schneider ........................... 210/387
3,855,126  12/1974 Smith ................................. 210/387

Primary Examiner—Ivars C. Cintins
Attorney, Agent, or Firm—Barnes, Kisselle, Raisch & Choate

[57] ABSTRACT

Apparatus for extracting used portions of filter media sheets from between vertically stacked and separated plates of a liquid filtering apparatus and for simultaneously advancing fresh portions of the filter media sheets from supply rolls into the space between the vertically separated plates comprises a plurality of vertically arranged clamps on the downstream side of the filter plates adapted to engage and firmly grip the opposite lateral edge portion of the sheets, the clamps being mounted on a carriage which is reciprocated through a linear generally horizontal stroke.

25 Claims, 12 Drawing Figures

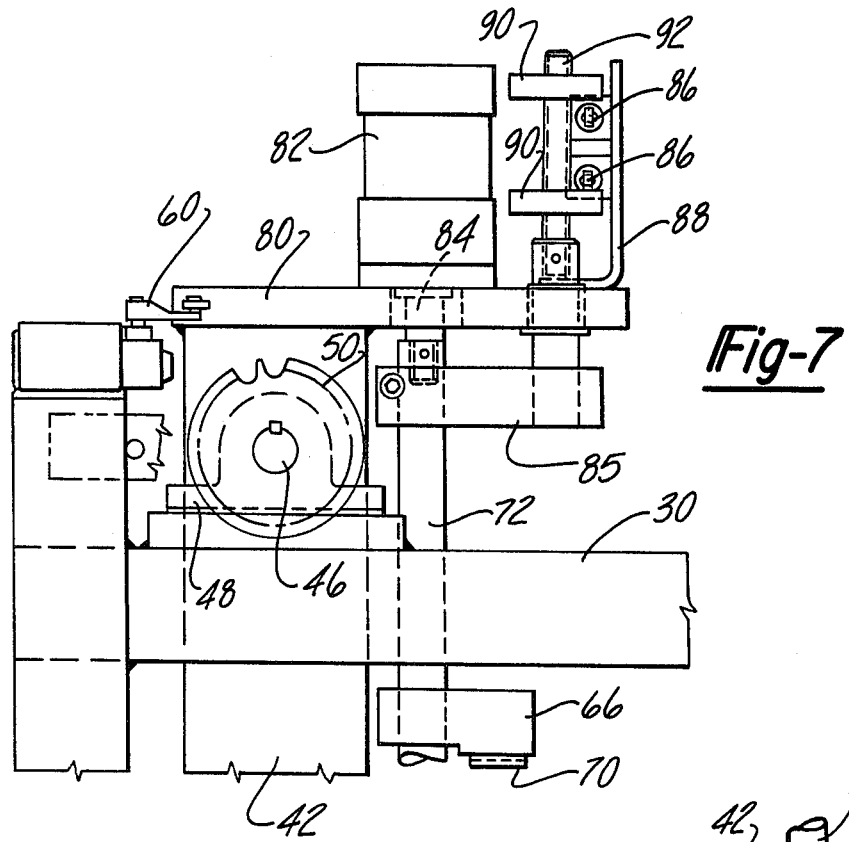
*Fig-7*
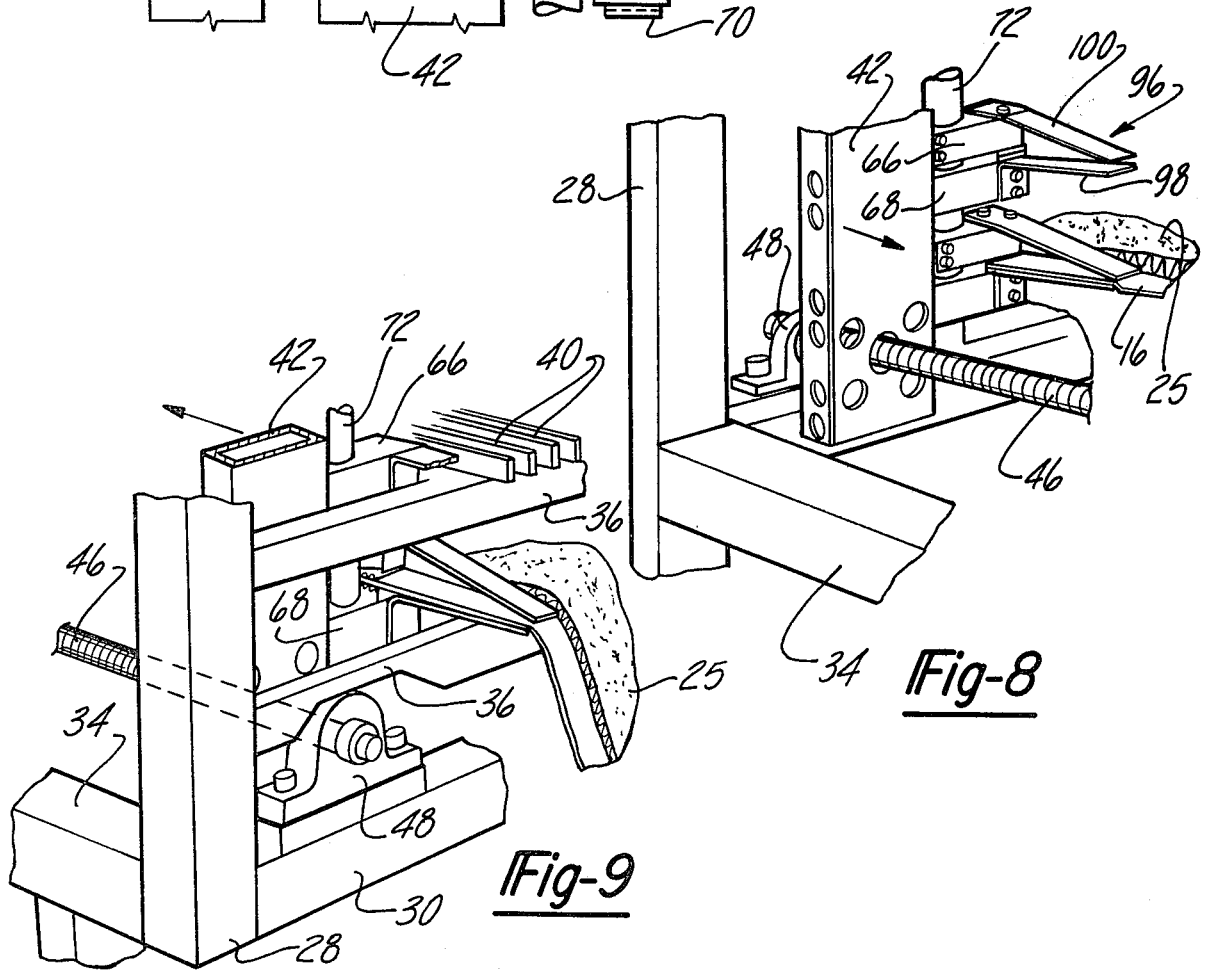
*Fig-8*
*Fig-9*

LIQUID FILTERING APPARATUS

This invention relates to a liquid filter apparatus and, more particularly, to an apparatus for extracting from between vertically separated filter plates used portions of filter media sheets and for simultaneously advancing a fresh portion of said sheets for supply rolls into the spaces between the separated filter plates. One type of liquid filter apparatus comprises a plurality of filter compartments in the form of plates stacked vertically upon one another with a sheet of filter media, usually cloth or paper, interposed horizontally between the vertically stacked filter plates. The filter media sheets are fed from a series of supply rolls at one side of the filter plates. After a predetermined amount of contaminants and/or powdered filter aid, such as diatomaceous earth, has accumulated on the filter sheet, the filter plates are vertically separated and the filter media sheet is advanced to simultaneously discharge the used portion of the filter sheet from between the plates and advance a fresh portion of the filter sheet from the supply roll.

Various types of arrangements have been employed for extracting the used portion of the filter sheet from between the filter plates and simultaneously advancing a fresh portion of the filter sheet to the filter plates. In one arrangement of this type a plurality of pointed pins spaced along a bar downstream of the filter plates and extending transversely thereof are caused to penetrate through the used section of the filter sheet and then advanced horizontally to extract the used portion of the filter sheet from between and advance a fresh portion of the filter sheet to the separated filter plates. While this type of arrangement is satisfactory in some installations, it does not function properly in the case of filter sheets that do not have substantial wet strength or in installations where particulate filtering aid is caused to build up onto the filter sheets. Such pins frequently produce tears in the wet filter sheets and fail to advance or index the sheets the required distance. With such installations this problem is sometimes overcome by air drying the wet filter sheet and the cake accumulated thereon before being advanced by the piercing pins, but this procedure unduly lengthens the time period between successive filtering cycles. Pinch rolls which are also sometimes employed for extracting used filter sheets are, likewise, not reliable in many instances and, like installations employing pin extractors, require constant attention and manual adjustment.

This primary object of this invention is to produce a filter media sheet extractor for use with a liquid filtering apparatus that is reliable in operation, does not require the attention of personnel and, is, therefore, truly automatic in its operation.

A more specific object of this invention is to provide a sheet extractor of the type described that is admirably suited for advancing the filter sheets even though the sheets are wet and have a wet cake of filter aid, such as diatomaceous earth, accumulated thereon.

A further object of the invention is to provide a sheet extractor for liquid filters which employ jaws adapted to grip a used portion of the filter sheet at the opposite lateral edges thereof where the sheet is normally dry as distinguished from sections of the sheet which are spaced inwardly from its laterally outer edges where it is wet and where contaminants and particulate filter aid has built up in the form of a cake.

Other objects, features and advantages of the present invention will become apparent from the following description and accompanying drawings, in which:

FIG. 1A is a fragmentary vertical sectional view of the filtering section of the apparatus;

FIG. 7 is a fragmentary elevational view on an enlarged scale of the portion of FIG. 2 within the circle designated 7;

FIG. 8 is a fragmentary perspective view of a portion of the extractor with the carriage in the retracted position;

FIG. 9 is a fragmentary perspective view of a portion of the extractor with the carriage in the advanced position;

Figure 1:
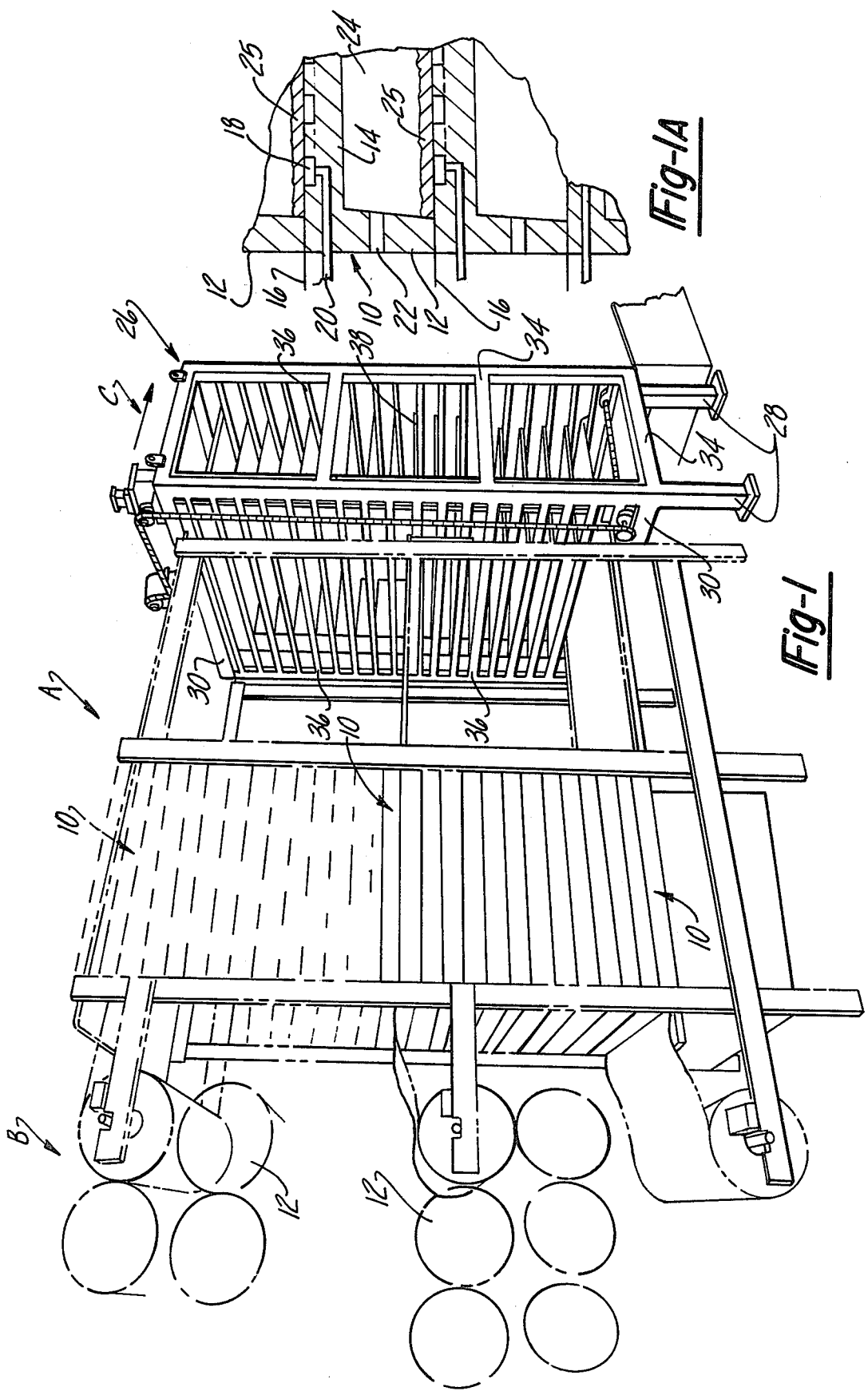
FIG. 1 is a perspective view, partly schematic and with portions omitted, showing a filtering apparatus employing the sheet extractor of the present invention.

Referring first to FIG. 1, there is illustrated in a general way a liquid filtering apparatus which includes a filtering section A comprising a plurality of vertically stacked and vertically separable plates 10, a filter media supply section B on the upstream side of the filtering section A comprising a plurality of rolls 12 of filter media in sheet form and a sheet extractor section C on the downstream side of the filtering section A. The filtering section A is of a conventional type, for example, similar to the filtering section shown in U.S. Pat. No. 3,608,734, and the details thereof are not illustrated or described except to the extent necessary to understand the construction and operation of the sheet extraction section C. For example, in the arrangement shown in FIG. 1 the filtering section A may comprise two vertical stacks of plates 10 positioned one downstream from the other between the supply section B and the sheet extraction section C. Likewise, means are provided for supplying large amounts of liquid to be filtered, such as machine tool coolants and/or lubricants, to the plates 10 of filter section A and for discharging the filtered liquid from plates 10. In addition, a means are provided for vertically separating the adjacent plates 10 periodically for advancing the filter media sheets therebetween.

In FIG. 1A there is illustrated in a general way a plurality of filter plates 10 stacked and sealed vertically upon one another. Each filter plate 10 is of generally rectangular shape and has a peripheral side wall 12 and a top wall 14. The individual sheets of filter media are designated 16 and are interposed between the upper faces of the top walls 14 of filter plates 10 and the lower flat end faces of side walls 12 of the next adjacent filter plate. It will be observed that the filter media sheets 16 preferably have a width greater than the width of plates 10 so that the laterally opposite edge portions thereof extend outwardly beyond the side walls 12 of the plates. The upper face of each top wall 14 is provided with a plurality of intersecting grooves 18 connected by one or more passageways 20 to an exhaust manifold (not shown) into which the filtered liquid is discharged. The side wall 12 of each plate 10 is provided with one or more inlet passages 22 connected to an inlet manifold (not shown) for supplying liquid to be filtered under pressure to each of the chambers 24 formed by the plates 10. In some filtering applications a particulate filter aid, such as diatomaceous earth, is periodically introduced into chambers 24 along with the liquid to be filtered. Over a period of time the particulate material and the contaminants filtered from the liquid may build up as a wet cake 25 on the filter media sheet 16. After the wet cake 25 has accumulated to a predetermined thickness, it is necessary to separate plates 10, extract the used portion of the filter sheet and replace it with a fresh section from the supply rolls 12. At this point it should be noted that, although the portion of each sheet lying within the peripheral boundaries of each chamber 24 is wet, the peripheral portions of each sheet 16 which are clamped between the lower end faces of the side walls 12 and the top face of the next lower plate are relatively dry. If the sheets 16 are wider than plates 12, as shown in FIG. 1A, then the portions of the sheets extending outwardly beyond the plates are also substantially dry. The construction of the pin extractor section C of the filtering apparatus is predicated on the fact that these peripheral edge portions of the filter media sheets 16 are substantially dry and, therefore, possess considerably more strength than the wet central portions of the filter sheets.

The filtering section C comprises an upright rectangular frame 26, preferably of welded construction, consisting of four corner ports 28 interconnected by transverse struts 30 adjacent the upper and lower ends thereof at the upstream side of frame 26 and by similar struts at the downstream or front side of frame 26. At each side of the frame the corner posts 28 are also connected by longitudinal struts 34. A plurality of vertically spaced parallel brackets 36 extend horizontally between the two posts 28 at the rear or upstream side of frame 26 and similar support brackets extend horizontally between the two posts 28 at the downstream end of the frame. The brackets 36 form supports for a plurality of vertically spaced and horizontally extending shelves 38 which correspond in number with the number of filtering chambers in the filtering section A.

Referring to FIGS. 2, 3, 9 and 11, each shelf 38 is in the form of a grate consisting of a plurality of longitudinally extending rails 40 which are spaced apart a distance substantially greater than the width of the rails 40. For example, rails 40 may have a width on the order of about $\frac{1}{8}''$ and are spaced apart transversely a distance on the order of about 15/16". Rails 40 provide a low friction support surface for the wet sheets 16 as compared with a generally continuous surface. The shelves 38 have a width at least slightly less than the width of filter sheets 16 and are aligned longitudinally with the filter plates 10 so that the laterally opposite edges of filter sheets 16 extend outwardly beyond the laterally outer edges of shelves 38. This is an important feature of the present invention.

Figure 2:
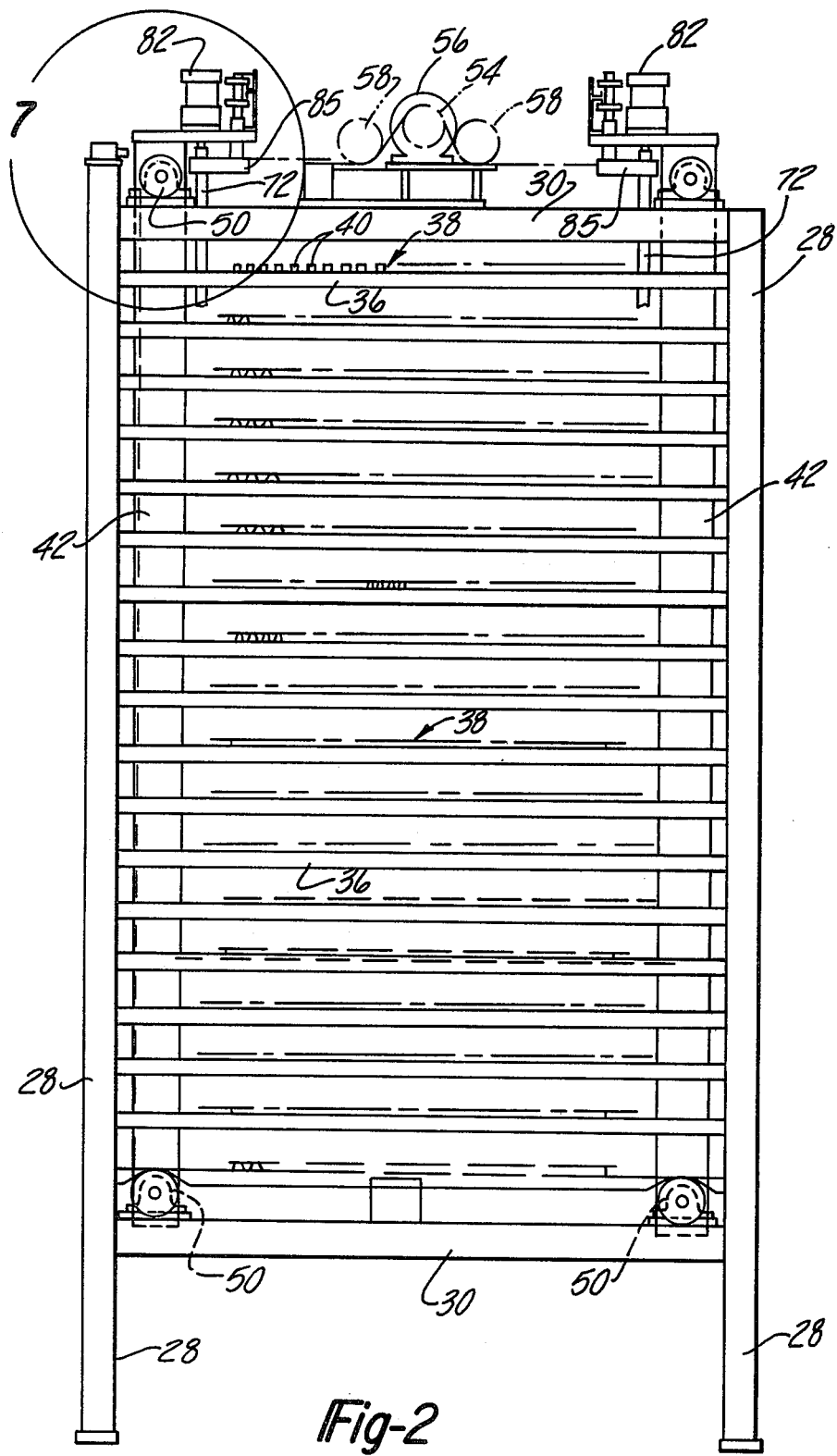
FIG. 2 is an elevational view of the downstream end of the sheet extractor.

As shown in FIG. 2, it will be observed that the corner posts 28 are spaced apart transversely a distance substantially greater than the width of shelves 38. The length of frame 26, that is, its dimension in the direction of travel of the filter sheets, may be less than equal to or greater than the length of the filter plates 10. However, as indicated in the embodiment illustrated, the length of frame 26 is less than the length of the filter plates 10. The relatively short length of frame 26 may be utilized simply for the purpose of reducing the overall length of the filtering apparatus.

Figure 3:
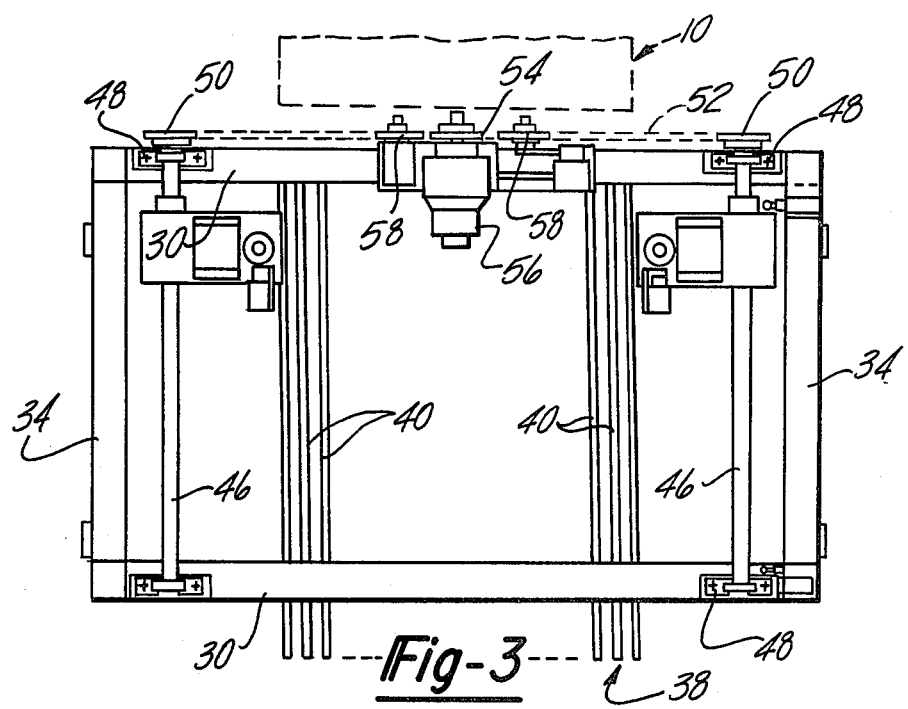
FIG. 3 is a top view of the sheet extractor.

The sheet extracting mechanism on frame 26 includes two upright hollow columns 42, one adjacent each side of the frame. Adjacent their upper and lower ends columns 42 have nuts 44 of the ball recirculating type mounted thereon. Each of the nuts 44 engages with a ball screw 46. The opposite ends of ball screws 46 are journalled in bearings 48; the bearings for the two lower ball screws are mounted adjacent the outer ends of the lowermost struts 30 and the bearings for the two upper ball screws are mounted adjacent the outer ends of the uppermost struts 30. Ball screws 46 extent horizontally parallel to the path of travel of the sheets 16. A sprocket 50 is keyed to the rear or upstream end of each ball screw 46. These sprockets are interconnected for rotation in unison by a continuous chain 52 which, as shown in FIGS. 2 and 3, is driven by a sprocket 54 on the shaft of a reversible motor 56. Adjustable idler sprockets 58 are employed to eliminate any slack in chain 52. Motor 56 and idler sprockets 58 are mounted on the uppermost strut 30 of frame 26 at the upstream end of the frame. The two upright columns 42 are aligned transversely on the ball screws 46 and form a carriage which travels downstream within frame 26 when motor 56 is driven in one direction and is retracted in an upstream direction when motor 56 is driven in the opposite direction. The travel stroke of columns 42 is determined by a pair of limit switches 60 mounted on frame 26 and adapted to be engaged by adjustable screws 62 at the upper end of one of the columns 42.

Figure 10:
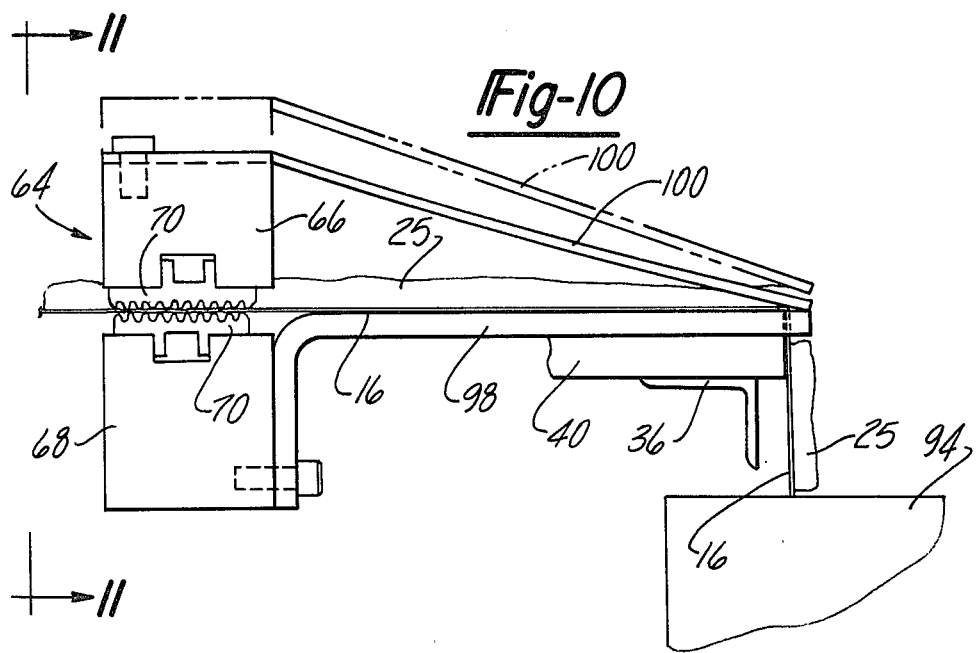
FIG. 10 is a fragmentary side elevational view on an enlarged scale illustrating one of the clamps.

The means for engaging and advancing the filter sheets 16 comprise a plurality of clamps 64, each of which comprises an upper jaw 66 and a lower jaw 68. The adjacent opposed faces of the jaw supports 66,68 have pads 70 mounted thereon. As shown in FIG. 10, pads 70 have opposed sheet gripping faces which are corrugated in a direction transversely of the length of the sheets. Clamps 64 are arranged in pairs at the opposite sides of shelves 38, there being two transversely aligned clamps adjacent the opposite side edges of each shelf 38. The lower jaw 68 of each clamp 64 is fixedly mounted on a column 42 and is positioned so that the corrugated clamping face of its pad 70 is generally horizontally aligned with the upper end faces of rails 40. The upper jaw 66 of each clamp 64 is clamped to a vertically extending shaft 72. Each shaft 72 is located laterally inwardly of its associated upright column 42 and extends vertically through the lower jaw support 68 mounted on the column. The uppermost and lowermost jaws 68 are preferably provided with guide bushings 74 in which the clamp rod 72 reciprocates vertically. The lowermost position of each clamp rod 72 is adjustable by means of a screw 76 mounted on the lower end of the associated column 42 and vertically adjustable to engage the lower end of rod 72. The upper jaw 66 of each clamp 64 is split where it encircles rod 72 and is locked thereon by screws 78 so that it can be adjusted to properly align the upper jaw pad 70 with the lower jaw pad 70. The upper and lower jaws 66,68, respectively, are designed such that, when properly adjusted, the jaw pads 70 are disposed laterally adjacent the laterally outer sides of shelves 38 so that, when the jaws are closed, opposite lateral edge portions of each sheet 16 are engaged between the corrugations of the jaw pads, the edge portions of the sheets being deformed between the corrugations and, thus, gripped to the desired extent.

As is best illustrated in FIG. 7, at the upper end of each column 42 there is secured a horizontally extending plate 80 on which a vertically disposed fluid cylinder 82 is mounted. The piston rod 84 of the piston in cylinder 82 is connected to the laterally extending arm 85 which is in turn clamped to the upper end of the associated clamp rod 72. A pair of limit switches 86 mounted on an upright bracket 88 on plate 80 are adapted to engage with discs 90 threaded on a vertical shaft 92 connected with arm 85. Switches 86 control the direction of rotation of the chain drive motor 56. When the lower switch 86 is actuated motor 56 is conditioned to retract the clamp carriage in an upstream direction and when the upper switch 86 is actuated the motor 56 is conditioned to advance the clamp carriage in a downstream direction. A cycle latch (not shown) determines the number of strokes of the extractor clamps during each cycle of operation.

Figure 4:
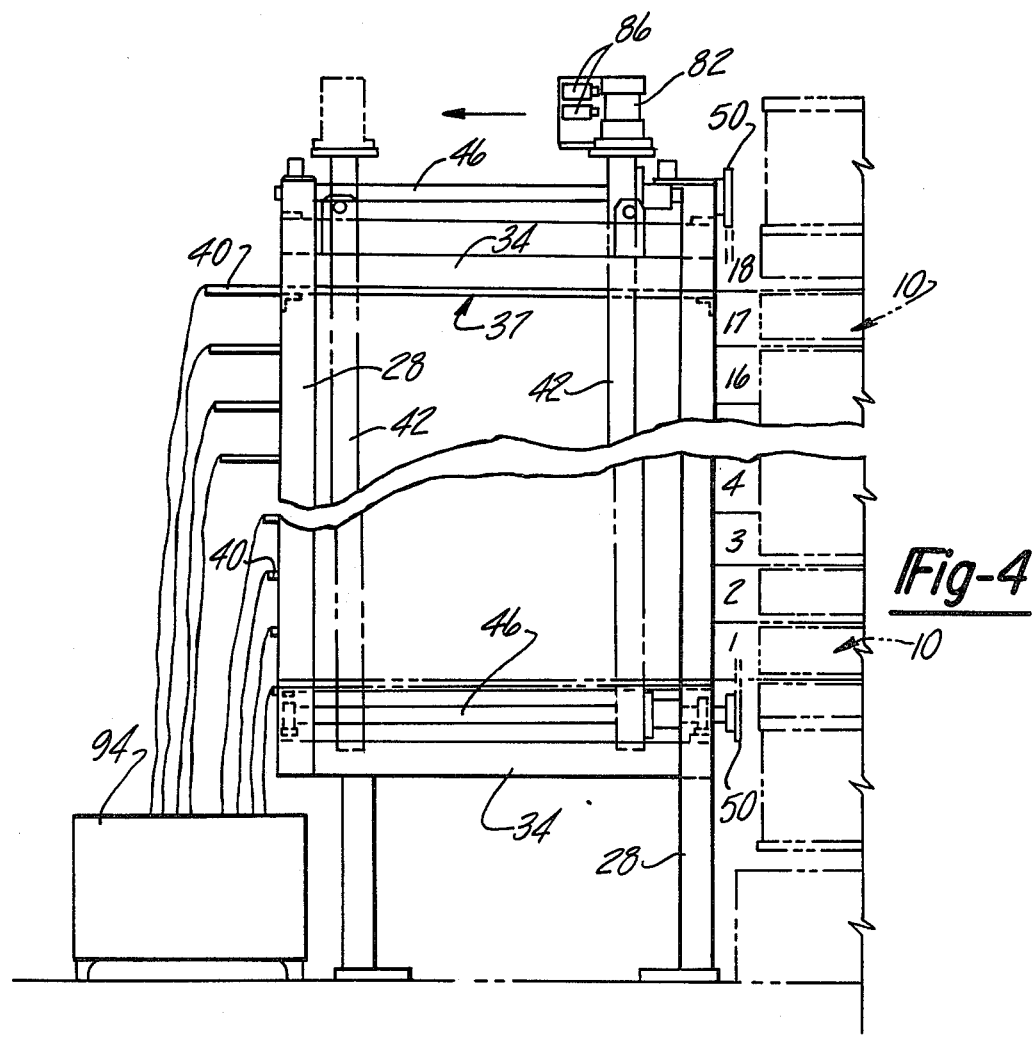
FIG. 4 is a fragmentary side elevational view of the sheet extractor.
Figure 5:
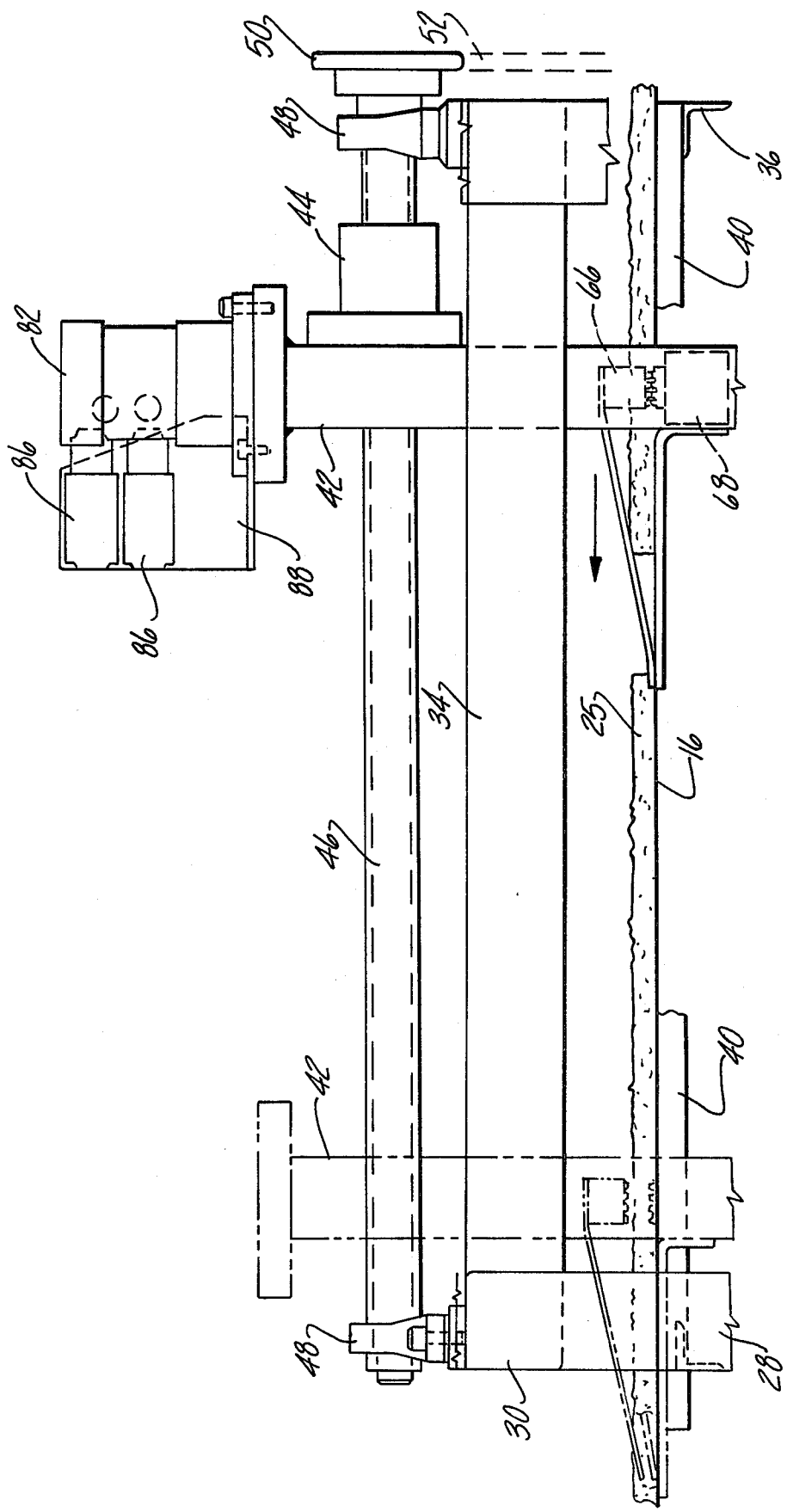
FIG. 5 is a fragmentary side elevational view on an enlarged scale of the upper end of the sheet extractor.
Figure 6:
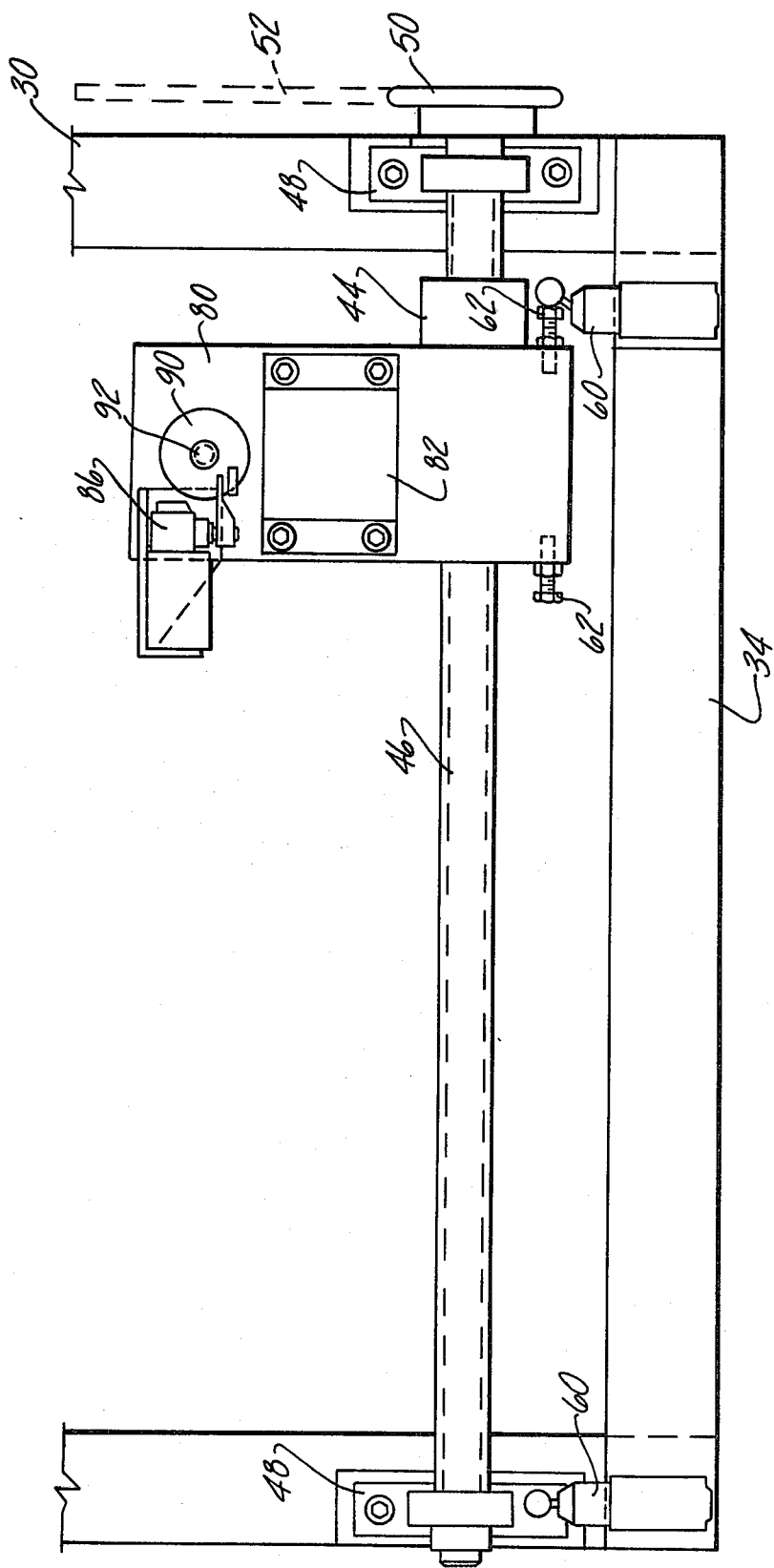
FIG. 6 is a fragmentary plan view on an enlarged scale of the upper end of the sheet extractor.
Figure 11:
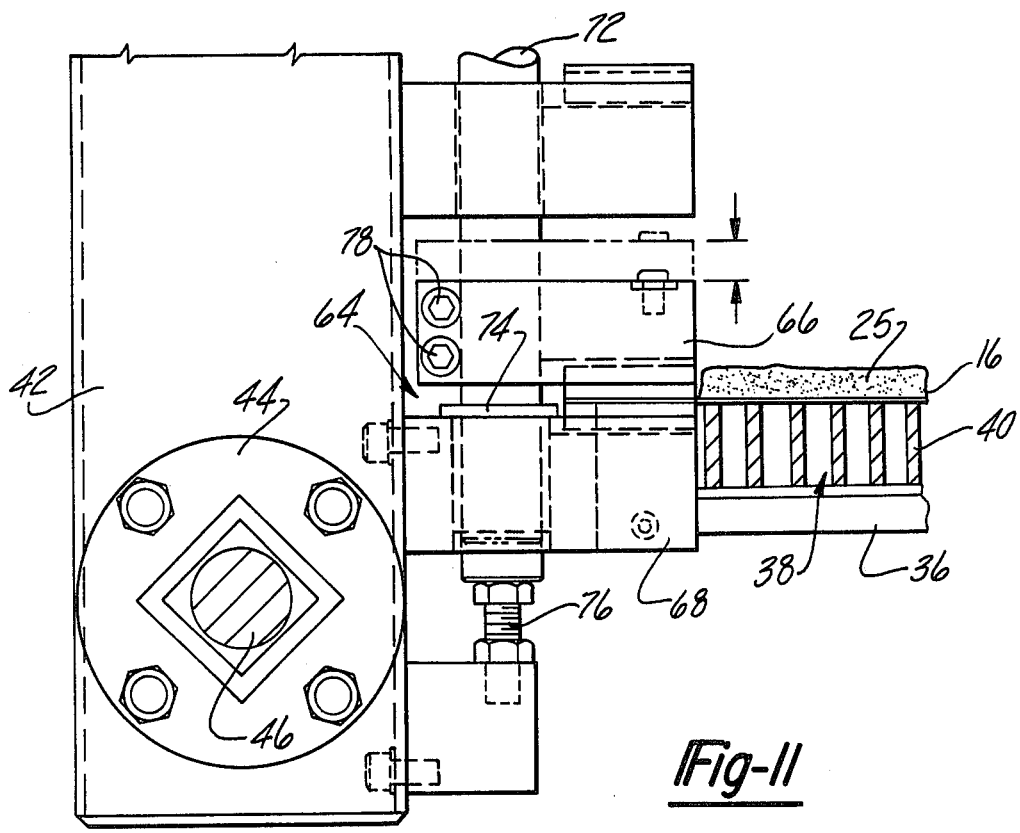
FIG. 11 is a fragmentary sectional view taken along the line 11—11 in FIG. 10.

Referring to FIG. 4, it will be noted that rails 40 are progressively shorter in length in a direction downwardly of frame 26. Stated differently, the downstream ends of rails 40 project outwardly beyond the front posts 28 of frame 26 a progressively greater extent in a direction upwardly of the frame. Rails 40 are dimensioned in this manner so that the filter media sheet discharging from an upper shelf 38 downwardly into a discharge bin 94 will not interfere with the filter sheet being discharged from the next lower shelf 38. In order to ensure that the sheet 16 will be extracted downstream and pulled to the ends of the rails 40 on which it is supported and in view of the fact that at the forwardmost end of the stroke of the carriage the upright coluns 42 are located rearwardly or upstream from the forward corner posts 28, auxiliary clamps 96 are associated with each clamp 64. Each auxiliary clamp 96 comprises a finger 98 mounted on and extending forwardly from each lower jaw support 68 and an upper finger 100 mounted on and extending forwardly from the upper jaw support 66. Fingers 98, 100 are aligned longitudinally with the jaw inserts 70. The upper finger 100 is preferably inclined downwardly in a forwardly direction and is preferably formed of a spring material. Spring finger 100 is inclined downwardly so that when the jaws are opened the forward ends of fingers 98,100 are spaced vertically apart a distance slightly less than the vertical spacing between the jaw pads 70. Thus, when the jaws are closed, the forward ends of fingers 98,100 engage and resiliently grip the outer peripheral edge portions of sheet 16 at a location spaced forwardly or downstream of the jaw pads 70. To compensate for the progressively increasing length of rails 40 in a direction upwardly of the frame, the fingers 98,100 are correspondingly progressively longer in an upward direction so that when the carriage is at the forward end of its stroke the forward ends of each set of fingers 98,100 will be located adjacent the forward ends of the associated rails 40 of the respective shelves 38. Thus, the filter sheet will not tend to accumulate on the forward ends of shelves 38.

When it becomes necessary to replace a used portion of the filter sheet with a fresh portion, the admission of fluid to be filtered to the filter plate chambers is discontinued and the filter plates 10 are vertically separated. At this point in time the upright supports 42 are in the retracted position adjacent the downstream end of the filter plates and jaws 64 are closed so that each filter sheet downstream just beyond the filter plates 10 is firmly gripped at its opposite dry edge portions by the jaw pads 70. Thereafter, the operation of motor 56 is initated to rotate ball screws 46 in a direction to advance the two uprights 42 in a downstream direction. The used portion of filter sheet which is gripped at its opposite dry edges by the jaw pads 70 and by the ends of the fingers 98,100 is advanced in a downstream direction and progressively extracted from between the separated filter plates. A uniform advancement of the sheets on sheleves 38 is enhanced by the fact that rails 40 present relatively little resistance to movement of the heavy wet sheet and yet provide ample support to substantially the entire portion of the sheet being advanced. If, as shown in the drawings, the stroke of the uprights 42 is less than the length of the filter plates 10, when the uprights 42 reach the forward end of their stroke cylinder 82 is actuated to retract the clamp rods 72 upwardly and thereafter motor 56 is energized to rotate the ball screws in the opposite direction and thus retract the upright supports 42 and the clamps supported thereon. This cycle is repeated until all of the used portion of the filter sheet has been completely extracted from between the separated filter plates. Simultaneously therewith fresh portions of the filter sheet will be unwound from the supply rolls 12 and drawn into the spaces between the vertically separated filter plates so as to present a fresh filter media sheet when the filter plates are displaced downwardly into sealed engagement and the filtering operation is continued. In a typical installation the stroke of the uprights 42 may be on the order of about 25" and the chambers 24 within filter plates may have a length on the order of about 36". Thus, between each filtering operation the carriage is indexed twice so that the filter sheet is advanced about 50" and there will be ample space between the successive cakes 25 of accumulated filter aid and contaminants to avoid interference with plates 10 when thereafter closed and to insure a completely fresh supply of filter sheet for the next filtering operation.

I claim:

1. In a liquid filtering apparatus of the type comprising a plurality of vertically stacked plates which are vertically separable and which form filtering chambers having an inlet for liquid to be filtered and an outlet for the filtered liquid and a plurality of supply rolls of filter media in sheet form at one side of said plates and from which a continuous strip of filter media extends to between the separable plates, an apparatus for extracting the used filter media sheet from between the plates when the latter are separated and for simultaneously feeding a fresh, unused section of the filter sheet downstream from each of said supply rolls to the spaces between the separated plates comprising a rigid frame on the opposite downstream side of said plates, a plurality of vertically spaced and generally parallel spaced filter sheet supports on said frame each forming a generally flat surface onto which the used portion of the filter sheet is adapted to be advanced from between the separated filter plates, said support surfaces being narrower than the filter sheet and aligned therewith so that the opposite edges of the filter sheet extend laterally outwardly beyond the opposite longitudinal edges of said support surfaces, a vertically extending carriage mounted on said frame for linear movement in a path generally parallel to said support surfaces, a plurality of vertically spaced clamps on opposite sides of said carriage aligned generally with said support surfaces, said clamps being located laterally outwardly of the opposite longitudinal edges of said support surfaces and in alignment with the opposite longitudinal edges of the filter sheets, said clamps having vertically separable jaws thereon adapted, when closed, to positively grip the sheets along the opposite side edge portions thereof and means for opening and closing said clamps and for reciprocating the carriage lengthwise of the frame such that when the carriage is in its retracted position adjacent the downstream side of said plates the clamps close to engage and grip the opposite edge portions of the filter sheets, the carriage then advances in a downstream direction to extract a section of each used filter sheet from between the separated plates and advances it along said supporting surface and simultaneously fresh sections of the filter sheets are unwound from the supply rolls and drawn into the space between the separated plates.

2. A filtering apparatus as called for in claim 1 wherein said jaws have opposed sheet clamping faces which, when the jaws close, are adapted to engage the upper and lower faces of the filter sheets along longitudinally extending edge portions thereof.

3. A filtering apparatus as called for in claim 2 wherein the clamping faces of the jaws are corrugated.

4. A filtering apparatus as called for in claim 3 wherein the jaws are corrugated in the direction transversely of the sheets.

5. A filtering apparatus as called for in claim 2 including means on the carriage for opening and closing all of the clamps in unison.

6. A filtering apparatus as called for in claim 2 wherein at least one jaw of each clamp is vertically displaceable for opening and closing the clamps.

7. A filtering apparatus as called for in claim 6 including a vertical shaft on each side of said carriage adapted to be reciprocated, the vertically displaceable jaws on each side of the carriage being operably connected with the reciprocable shaft and means for reciprocating said shaft at the opposite ends of the stroke of the carriage such that all of the clamps close when the carriage is in the retracted position and all of the clamps open when the carriage advances to the end of its forward stroke.

8. A filtering apparatus as called for in claim 7 wherein said shaft reciprocates vertically.

9. A filtering apparatus as called for in claim 2 wherein one jaw of each clamp is vertically fixed to the carriage and the other jaw is vertically displaceable relative to the carriage.

10. A filtering apparatus as called for in claim 9 wherein the upper jaw of each clamp is vertically displaceable.

11. A filtering apparatus as called for in claim 2 wherein the clamps on each side of the carriage are vertically aligned.

12. A filtering apparatus as called for in claim 11 wherein the clamps on the opposite sides of the carriage are transversely aligned.

13. A filtering apparatus as called for in claim 2 wherein said sheet support surfaces extend downstream beyond said jaws when the carriage is in the advanced position.

14. A filtering apparatus as called for in claim 13 including a pair of fingers extending in a downstream forward direction from each clamp, said fingers being arranged to grip the opposite side edge portions of said sheet at a section thereof spaced downstream from the edge portion gripped by said jaws.

15. A filtering apparatus as called for in claim 14 wherein the forward ends of said fingers are adapted to grip the edges of the filter sheets, the forward ends of the fingers being located directly adjacent the forward ends of said support surfaces when the carriage is in the advanced position.

16. A filtering apparatus as called for in claim 15 wherein said fingers are vertically separable to grip and release the edges of the filter sheets.

17. A filtering apparatus as called for in claim 16 wherein at least one jaw in each pair is vertically displaceable to grip and release the edges of the filter sheets and one finger in each pair is operably connected with the associated vertically displaceable jaw to move vertically therewith.

18. A filtering apparatus as called for in claim 17 wherein at least one finger in each pair is resiliently flexible in a vertical direction so as to flex into pressure engagement with the filter sheets when the fingers grip the edges of the sheets.

19. A filtering apparatus as called for in claim 2 wherein the top face of each sheet support comprises a plurality of narrow surfaces extending lengthwise of the path of travel of the sheets and spaced apart a distance substantially greater than their widths.

20. A filtering apparatus as called for in claim 2 wherein each sheet support comprises a plurality of rails extending lengthwise of the path of travel of the sheets and spaced apart transversely a distance substantially greater than their width.

21. A filtering apparatus as called for in claim 1 wherein said carriage comprises a pair of upright supports, one adjacent each side of said frame, a pair of horizontal guide members adjacent each side of said frame adjacent the upper and lower ends thereof, said sheet supports extending in a direction downstream from said plates in parallel relation, the upper ends of said upright supports being connected to the two upper guide members and the lower ends of the upright supports being connected to the two lower guide members and means for reciprocating the two upright supports in unison lengthwise of and on said guide members.

22. A filtering apparatus as called for in claim 21 including an upright shaft mounted on each upright support member for reciprocation, means for reciprocating each of said shafts in unison, each clamp comprising a pair of jaws, one of which is fixedly mounted on said upright support and the other is operably connected with said upright shaft for operation thereby.

23. A filtering apparatus as called for in claim 22 wherein said upright shafts are mounted on the upright supports for vertical reciprocation.

24. A filtering apparatus as called for in claim 22 wherein said screws and nuts are of the ball recirculating type.

25. A filtering apparatus as called for in claim 21 wherein said guide members comprise rotatable screws, the upright supports having nuts adjacent the upper and lower ends thereof engage with said screws, the means for reciprocating said upright supports comprising means for rotating the screws in unison.

* * * * *